United States Patent
Mazzarella et al.

(10) Patent No.: US 6,819,921 B2
(45) Date of Patent: Nov. 16, 2004

(54) METHOD OF SUBSCRIBER INITIATED PORTING OF A WIRELESS NUMBER FOR A MOBILE STATION

(75) Inventors: Nick J. Mazzarella, DuPage, IL (US); Douglas Harold Rollender, Somerset, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 469 days.

(21) Appl. No.: 09/773,572

(22) Filed: Feb. 2, 2001

(65) Prior Publication Data

US 2002/0107011 A1 Aug. 8, 2002

(51) Int. Cl.[7] ................................................ H04M 3/00
(52) U.S. Cl. .................... 455/419; 455/414.1; 455/433; 455/445; 379/221.13
(58) Field of Search .............................. 455/419, 414.4, 455/414.1, 433, 445; 379/221.13

(56) References Cited

U.S. PATENT DOCUMENTS

| | | | | |
|---|---|---|---|---|
| 6,192,241 B1 | * | 2/2001 | Yu et al. | 455/433 |
| 6,192,242 B1 | * | 2/2001 | Rollender | 455/433 |
| 6,226,517 B1 | * | 5/2001 | Britt et al. | 455/445 |
| 6,240,293 B1 | * | 5/2001 | Koster | 455/445 |
| 6,253,081 B1 | * | 6/2001 | Koster | 455/433 |
| 6,366,663 B1 | * | 4/2002 | Bauer et al. | 379/221.13 |
| 6,424,832 B1 | * | 7/2002 | Britt et al. | 455/432.1 |
| 6,535,746 B1 | * | 3/2003 | Yu et al. | 455/466 |
| 2001/0040957 A1 | * | 11/2001 | McCann et al. | 379/221.13 |
| 2002/0052211 A1 | * | 5/2002 | Kim et al. | 455/461 |
| 2003/0054809 A1 | * | 3/2003 | Bridges et al. | 455/419 |

* cited by examiner

*Primary Examiner*—William Trost
*Assistant Examiner*—Shared Rampuria

(57) ABSTRACT

In the method of subscriber initiated porting of a wireless number for a mobile station, a new service provider receives a porting request sent by a subscriber, and sends a profile request to a current service provider of the subscriber in response to the porting request. The profile request requests profile information on the subscriber. Subsequently, the new service provider receives the profile information for the subscriber, and sends a porting complete notification to the subscriber.

21 Claims, 1 Drawing Sheet

METHOD OF SUBSCRIBER INITIATED PORTING OF A WIRELESS NUMBER FOR A MOBILE STATION

BACKGROUND OF THE INVENTION

1. Field of the Invention

The present invention relates to porting a wireless number of a mobile station.

2. Description of Related Art

When a subscriber first obtains wireless communications service from a wireless service provider, the wireless service provider assigns a mobile station identification number MSIN (e.g., MIN, IMSI, etc.) and a mobile directory number (MDN) to the mobile station of the subscriber, wherein the MSIN is a number used by the wireless service provider to uniquely identify the subscriber and/or the mobile station, and the MDN is the telephone number of the mobile station. If the subscriber thereafter desires to switch to a new wireless service provider, the subscriber must surrender the MDN assigned to its mobile station by the old wireless service provider, and be assigned a new MDN by the new wireless service provider. Changing MDNs can be extremely inconvenient, especially if the MDN is used for business. Therefore, it would be convenient if a subscriber could take or "port" a MDN from one wireless service provider to another. In other words, it would be advantageous if a subscriber does not have to change the MDN when he or she switches wireless service providers. Furthermore, it would be advantageous for the subscriber to initiate porting of the MDN, and for the subscriber to have the MDN ported without having to physically visit either the old or new service provider.

SUMMARY OF THE INVENTION

In the method of porting a wireless number of a mobile station according to the present invention, a new service provider receives a porting request sent by a subscriber and sends a profile request to a current service provider of the subscriber in response to the porting request. The profile request requests profile information on the subscriber so that the new service provider can set up service for the subscriber. In a preferred embodiment, the porting request includes security information, and the current service provider receives the security information as part of the profile request. In this manner, the current service provider can verify that the subscriber has authorized sharing the subscriber's profile with the new service provider.

Once verified, the current service provider sends the profile information for the subscriber to the new service provider. Then, the new service provider notifies the wireless number portability administration system of the wireless number porting. In response the administration system indicates a complete transfer of the wireless number, and the current and new service providers update their respective databases. The new service provider then has the subscriber reprogram his mobile station and informs the subscriber that porting of the wireless number is complete.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF THE PREFERRED EMBODIMENTS

Figure 1:
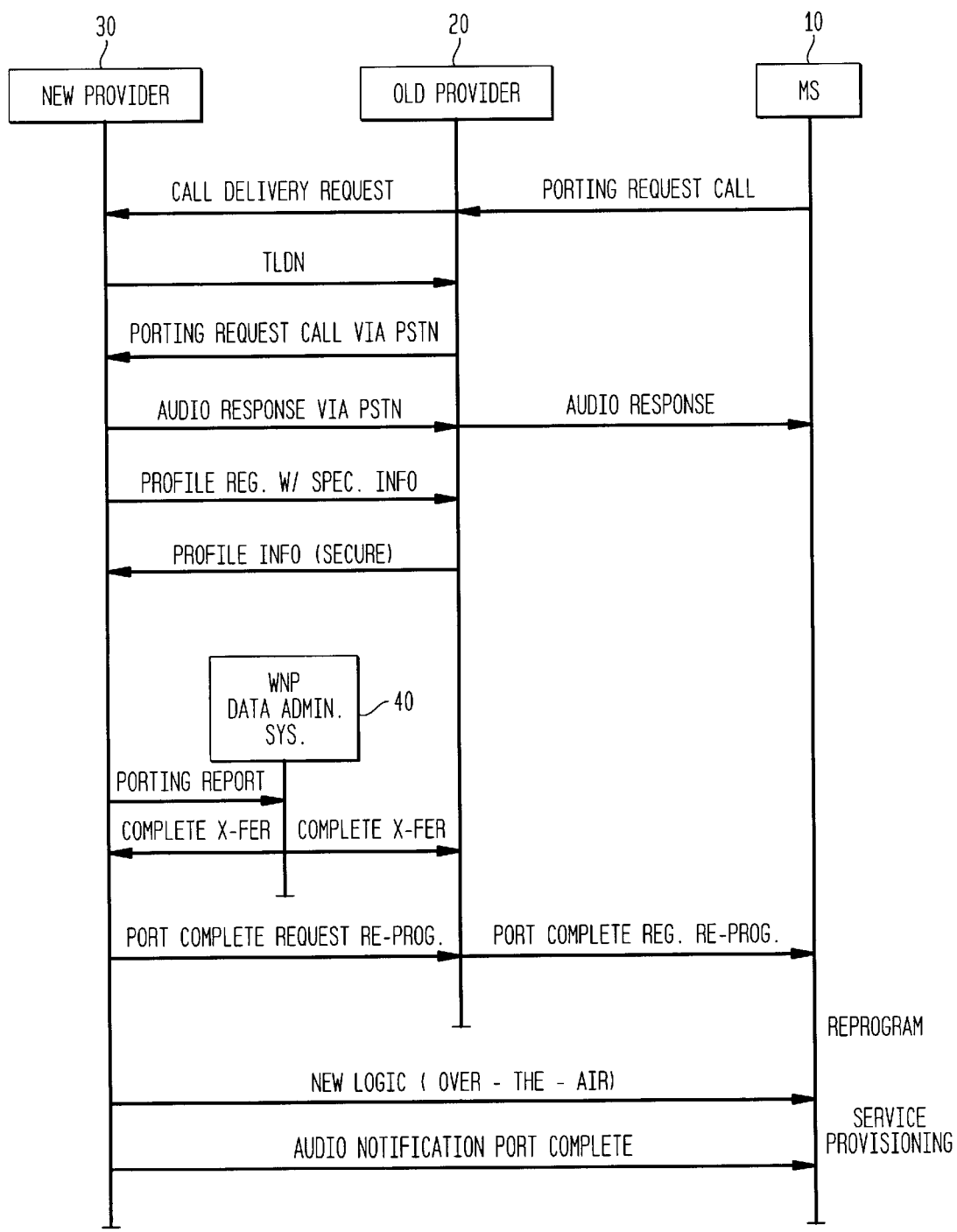
FIG. 1 illustrates the communication between a mobile station, an old service provider, a new service provider, and a wireless number portability administration system according to the subscriber initiated number portability method of the present invention.

Provisions for porting a mobile directory number are expected to be specified in the well-known ANSI Standard 41. When porting a subscriber's MDN at least five distinct events, which are not required when the subscriber switches wireless service providers without porting the MDN, occur in the method of the present invention. One, a wireless number portability administrative system (WPNAS) is informed of the intent to port the subscriber's MDN from the old or donor wireless service provider, wherein the WPNAS includes a database for associating subscribers' MDNs to location routing numbers (LRNs) identified with wireless service providers currently providing wireless communications service to the subscribers.

Two, Number Portability Databases (NPDB) belonging to wireless service providers (including the new and old wireless service providers) must be updated using the WPNAS such that the porting of the subscriber's MDN is associated with the LRN identifying the new wireless service provider. Three, a new Mobile Station Identification Number (MSIN) must be assigned to the subscriber's mobile station by the new wireless service provider, and a record or entry for the subscriber must be created in a Home Location Register (HLR) belonging to the new wireless service provider, wherein the HLR includes information about subscribers of the wireless service provider to which the HLR belongs, including information associating the newly assigned MSIN to the MDN being ported. Thus, the porting subscriber is now recognized by the new wireless service provider as one of its subscribers.

Four, the subscriber's mobile station must be re-programmed with the new MSIN assigned by the new wireless service provider such that the wireless terminal will respond to pages to the new MSIN. And lastly, the subscriber's entry in the old wireless service provider's HLR must be deleted such that the ported subscriber is no longer a subscriber of the old wireless service provider.

If all five events do not occur somewhat simultaneously, the wireless communication service to the subscriber can be interrupted. For example, if the NPDB is updated before the subscriber's record is created in the new wireless service provider's HLR, then a call to the subscriber's mobile station may not be completed because the recipient wireless service provider would not recognize the mobile station as belonging to one of its subscribers. Likewise, if the NPDB is updated long before the subscriber's mobile station is re-programmed with the new MSIN from the new wireless service provider, then a call to the subscriber's mobile station may not be completed because the mobile station would not recognize the new MSIN as its own and respond to a page to the new MSIN.

Furthermore, the coordination of these five events is complicated by the fact that the disparate elements are owned and operated by different entities. For example, the old wireless service provider owns and operates its NPDB and HLR, the new wireless service provider owns and operates its NPDB and HLR, and the subscriber owns and operates the mobile station. Therefore, as described in detail below the method according to the present invention enables a subscriber's mobile directory number to be ported from an old wireless service provider to a new wireless service provider with a minimum interruption to the subscriber's wireless communication service.

FIG. 1 illustrates the communication between a mobile station 10, an old service provider 20, a new service provider 30, and a wireless number portability administration system 40 (also called a number portability administration center) according to the subscriber initiated number portability method of the present invention. As shown, a subscriber initiates a call via his mobile station 10 to a new service provider 30. The call requests that the new service provider 30 become the subscriber's service provider and that the mobile directory number MDN of the mobile station 10 be ported from the current, but soon to be old, service provider 20 to the new service provider 30. Because the old service provider 20 is still the current service provider, the old service provider receives the porting request call. The porting request call also includes the MSIN of the mobile station and/or the electronic serial number (ESN) of the mobile station, and the security information known to the old service provider 20. The security information could be, for example, a personal identification number assigned to the subscriber by the old service provider 20, but is not limited in any fashion to this example. Also, the security information is added to the call by, for example, the subscriber via key input on the mobile station 10, but is not limited in any fashion to this example.

Because the call is directed to the new service provider 30, the old service provider 20 sends a call delivery request to the new service provider 30. The call delivery request indicates that the old service provider 20 wants to deliver a call to the new service provider 30. In response to the call delivery request, the new service provider 30 selects an unused one of its local directory numbers (LDN) on a public switch telephone network (PSTN), and sends this LDN as a temporary LDN (TLDN) to the old service provider 20. Upon receipt of the TLDN, the old service provider 20 forwards the porting request call to the TLDN of the new service provider 30 via the PSTN.

In response to the porting request call, the new service provider 30 sends an audio response to the mobile station 10 of the subscriber via the PSTN and the old service provider 20. The audio response is a message indicating that the porting request call has been received and is being processed. Also in response to the porting request call, the new service provider 30 sends the old service provider 20 via, for example, an SS7 link a subscriber profile request. The subscriber profile request identifies the subscriber of the mobile station 10 by the MSIN and/or the ESN received with the porting request; requests the subscriber's profile; and includes the security information contained in the porting request call. The subscriber's profile is, for example, the information in the ASNI-41 HLR/VLR subscriber profile (e.g., the ESN, MSIN, call features, forwarding numbers, etc.).

If the security information received by the old service provider 20 matches the security information on file at the old service provider 20 for the subscriber, then the old service provider 20 provides the subscriber profile to the new service provider 30 over the SS7 link.

Using the subscriber profile, the new service provider 30 sets up the subscriber as a subscriber of the new service provider 30. As discussed previously, this involves assigning a new MSIN to the subscriber, associating the subscriber's profile and MDN being ported with the new MSIN within the HLR of the new service provider 30. Then, the new service provider 30 provides the wireless number portability administration system 40 with a porting report. The porting request will vary depending on the service provider, but will provide information such as the new service provider's ID, the MDN being ported, the time/date of the service change, and, perhaps, some service information needed for wireless number porting administration.

Based on the porting report, the wireless number portability administration system 40 updates its database so that the MDN of the mobile station 10 is associated with the LRNs of the new service provider 30. Then the wireless number portability administration system 40 sends a porting complete message to both the new service provider 30 and the old service provider 20.

In response to the porting complete message, the old service provider 20 updates its HLR and NPDB to eliminate the subscriber.

The new service provider 30 also updates its NPDB, and sends a porting complete/reprogram request to the mobile station 10 via the old service provider 20 as part of the same call that started with the porting request. The porting complete/program request provides the subscriber, via the mobile station 10, with the frequency bands for the mobile station 10 to effect wireless communication directly with the new service provider 30.

Upon receipt of the porting complete/reprogram request, the subscriber ends the call he initiated, and reprograms the mobile station 10 in any well-known manner to use the supplied frequency bands.

After a predetermined period of time (e.g., five minutes) to allow the subscriber to reprogram the mobile station 10, the new service provider 30 sends the over-the-air (OTA) commands to update the mobile station 10 with new carrier information (e.g., carrier identifier, roaming conditions, security keys, new MSIN, etc.) according to any well-known OTA service provisioning procedure. Subsequently, the new service provider 30 sends an audible notification to the subscriber via the mobile station 10 to notify the subscriber that provision of the mobile station 10 and porting of the MDN is complete. The subscriber may now begin receiving service from the new service provider 30.

As explained above, the wireless number porting method according to the present invention satisfies the five events discussed above and allows the porting of a wireless number without ever having to physically visit either the old or new service providers 20 and 30.

The invention being thus described, it will be obvious that the same may be varied in many ways. Such variations are not to be regarded as a departure from the spirit and scope of the invention, and all such modifications are intended to be included within the scope of the following claims.

We claim:

1. A method of subscriber initiated porting of a wireless number for a mobile station, comprising:
   receiving, at a new service provider, a porting request sent by a subscriber;
   sending a profile request to a current service provider of the subscriber in response to the porting request, the profile request requesting profile information on the subscriber;
   receiving, at the new service provider, the profile information for the subscriber;
   sending a porting complete notification to the subscriber.

2. The method of claim 1, wherein the porting request is received via the current service provider.

3. The method of claim 1, wherein the porting request is received via a public telephone switch network.

4. The method of claim 1, further comprising:

receiving a call delivery request from the current service provider;

sending a local directory number of a public telephone switch network to the current service provider; and wherein the receiving the porting request step receives the porting request at the local directory number via the current service provider and the public telephone switch network.

5. The method of claim 1, further comprising:

sending an audio message to the subscriber indicating receipt of the porting request.

6. The method of claim 1, wherein the receiving the porting request step further receives secure information from the subscriber; and the sending the profile request step includes sending the secure information with the profile request so that the current service provider can verify the profile request as a valid request.

7. The method of claim 1, wherein the sending the profile request step sends the profile request over a secure communication channel.

8. The method of claim 1, wherein the receiving the profile information step receives the profile information over a secure communication channel.

9. The method of claim 1, further comprising:

sending a porting report to a porting administration system;

receiving a porting complete message from the porting administration system; and wherein the sending the porting complete notification step sends the porting complete notification to the subscriber in response to the porting complete message.

10. The method of claim 9, wherein the porting complete notification notifies the subscriber to reprogram the mobile station.

11. The method of claim 10, further comprising:

sending new communication logic to the subscriber a predetermined period of time after sending the porting complete notification.

12. The method of claim 11, further comprising:

sending an audio-message to the subscriber indicating that porting has completed.

13. The method of claim 1, wherein the porting complete notification notifies the subscriber to reprogram the mobile station.

14. The method of claim 13, further comprising:

sending new communication logic to the subscriber a predetermined period of time after sending the porting complete notification.

15. The method of claim 14, further comprising:

sending an audio message to the subscriber indicating that porting has completed.

16. The method of claim 1, wherein the receiving the porting request step and the sending the porting complete notification steps take place as part of a subscriber initiated call to the new service provider.

17. A method of subscriber initiated porting of a wireless number for a mobile station, comprising:

sending a porting request to a new service provider;

receiving a porting complete notification;

reprogramming the mobile station upon receipt of the porting complete notification; and updating communication logic at the mobile station.

18. The method of claim 17, wherein the sending step includes sending secure information with the porting request.

19. A method of subscriber initiated porting of a wireless number for a mobile station, comprising:

receiving a profile request for a subscriber at a service provider from another service provider, the profile request requesting profile information on the subscriber;

verifying the profile request; and sending the profile information to the another service provider when the verifying step verifies the profile request.

20. The method of claim 19, wherein the receiving step receive secure information on the subscriber; and the verifying step performs the verification based on the secure information.

21. The method of claim 19, further comprising:

receiving a porting complete message from a porting administration system.

* * * * *